(12) United States Patent
Lee et al.

(10) Patent No.: US 10,735,784 B2
(45) Date of Patent: Aug. 4, 2020

(54) SOCIAL MEDIA ASSET PORTAL

(71) Applicant: SCRIPPS NETWORKS INTERACTIVE, INC., Knoxville, TN (US)

(72) Inventors: Scott Lee, Knoxville, TN (US); Brian Clough, Knoxville, TN (US)

(73) Assignee: SCRIPPS NETWORKS INTERACTIVE, INC., Knoxville, TN (US)

(*) Notice: Subject to any disclaimer, the term of this patent is extended or adjusted under 35 U.S.C. 154(b) by 125 days.

(21) Appl. No.: 15/941,060

(22) Filed: Mar. 30, 2018

(65) Prior Publication Data
US 2018/0367826 A1 Dec. 20, 2018

Related U.S. Application Data

(60) Provisional application No. 62/479,682, filed on Mar. 31, 2017.

(51) Int. Cl.
*H04N 7/16* (2011.01)
*H04N 21/2343* (2011.01)
(Continued)

(52) U.S. Cl.
CPC ... *H04N 21/234309* (2013.01); *G06F 16/116* (2019.01); *G06F 16/176* (2019.01); *G06F 16/71* (2019.01); *G11B 27/02* (2013.01); *H04N 5/268* (2013.01); *H04N 21/231* (2013.01); *H04N 21/23424* (2013.01); *H04N 21/4788* (2013.01);
(Continued)

(58) Field of Classification Search
CPC ......... H04N 21/4331; H04N 21/47202; H04N 21/235; H04N 21/435; H04N 21/2221; H04N 21/812; H04N 21/4532; H04N 21/44222; H04N 21/25891;
(Continued)

(56) References Cited

U.S. PATENT DOCUMENTS

| 2007/0157251 | A1* | 7/2007 | Shrivastava | H04N 5/44513 725/60 |
| 2010/0088726 | A1* | 4/2010 | Curtis | G11B 27/034 725/45 |
| 2011/0321100 | A1* | 12/2011 | Tofighbakhsh | H04N 21/2668 725/58 |
| 2012/0324058 | A1* | 12/2012 | Biderman | H04N 7/17318 709/219 |
| 2013/0291008 | A1* | 10/2013 | Abed | H04N 7/0882 725/32 |
| 2015/0074201 | A1* | 3/2015 | Maria | H04L 51/10 709/206 |

(Continued)

*Primary Examiner* — Annan Q Shang
(74) *Attorney, Agent, or Firm* — J. A. Lindeman & Co. PLLC

(57) ABSTRACT

The invention includes systems and methods for receiving, curating, and distributing audio, video, and image assets and other files. The systems automatically receive and simultaneously process the assets for distribution and consumption in many formats. In one example, the invention distributes prepared and curated media assets (media clips) via social media outlets for subsequent consumption. The invention includes compression and other formatting techniques to manage different sized video segments and image files. The system creates a pipeline for the creation of video clips, conversion of video clips to multiple usable formats, delivery of the video clips to social media account managers, and notification to the social media managers of the availability of the clips. The system distributes usable content (video clips) via social media outlets and functions as a branding asset, traffic attractor, and a revenue generator through advertising and other sources.

14 Claims, 12 Drawing Sheets

(51) Int. Cl.
    *H04N 21/472* (2011.01)
    *H04N 21/231* (2011.01)
    *G06F 16/71* (2019.01)
    *G06F 16/11* (2019.01)
    *G06F 16/176* (2019.01)
    *H04N 21/854* (2011.01)
    *G11B 27/02* (2006.01)
    *H04N 21/234* (2011.01)
    *H04N 21/4788* (2011.01)
    *H04N 21/845* (2011.01)
    *H04N 5/268* (2006.01)

(52) U.S. Cl.
    CPC ... *H04N 21/47205* (2013.01); *H04N 21/8456* (2013.01); *H04N 21/854* (2013.01)

(58) Field of Classification Search
    CPC ..... H04N 21/234309; H04N 21/47205; H04N 21/17318; H04N 21/17336; H04N 21/165
    See application file for complete search history.

(56) References Cited

U.S. PATENT DOCUMENTS

| | | | |
|---|---|---|---|
| 2015/0207841 A1* | 7/2015 | Drang | H04N 21/23109 709/219 |
| 2015/0212991 A1* | 7/2015 | Barraclough | G06F 40/14 715/204 |
| 2015/0296228 A1* | 10/2015 | Chen | G06F 16/78 725/34 |
| 2016/0014482 A1* | 1/2016 | Chen | G11B 27/031 386/241 |
| 2016/0037217 A1* | 2/2016 | Harmon | H04N 21/45457 725/9 |
| 2016/0080470 A1* | 3/2016 | Shanson | H04L 65/4084 709/219 |
| 2016/0094875 A1* | 3/2016 | Peterson | H04N 21/44016 725/41 |
| 2016/0255414 A1* | 9/2016 | Hao | H04N 21/812 725/32 |
| 2016/0337718 A1* | 11/2016 | Talbott | H04N 21/8547 |
| 2017/0094341 A1* | 3/2017 | Berner | H04N 21/44008 |
| 2018/0014037 A1* | 1/2018 | Venkatraman | H04L 65/601 |
| 2018/0014052 A1* | 1/2018 | Venkatraman | H04N 21/2668 |

\* cited by examiner

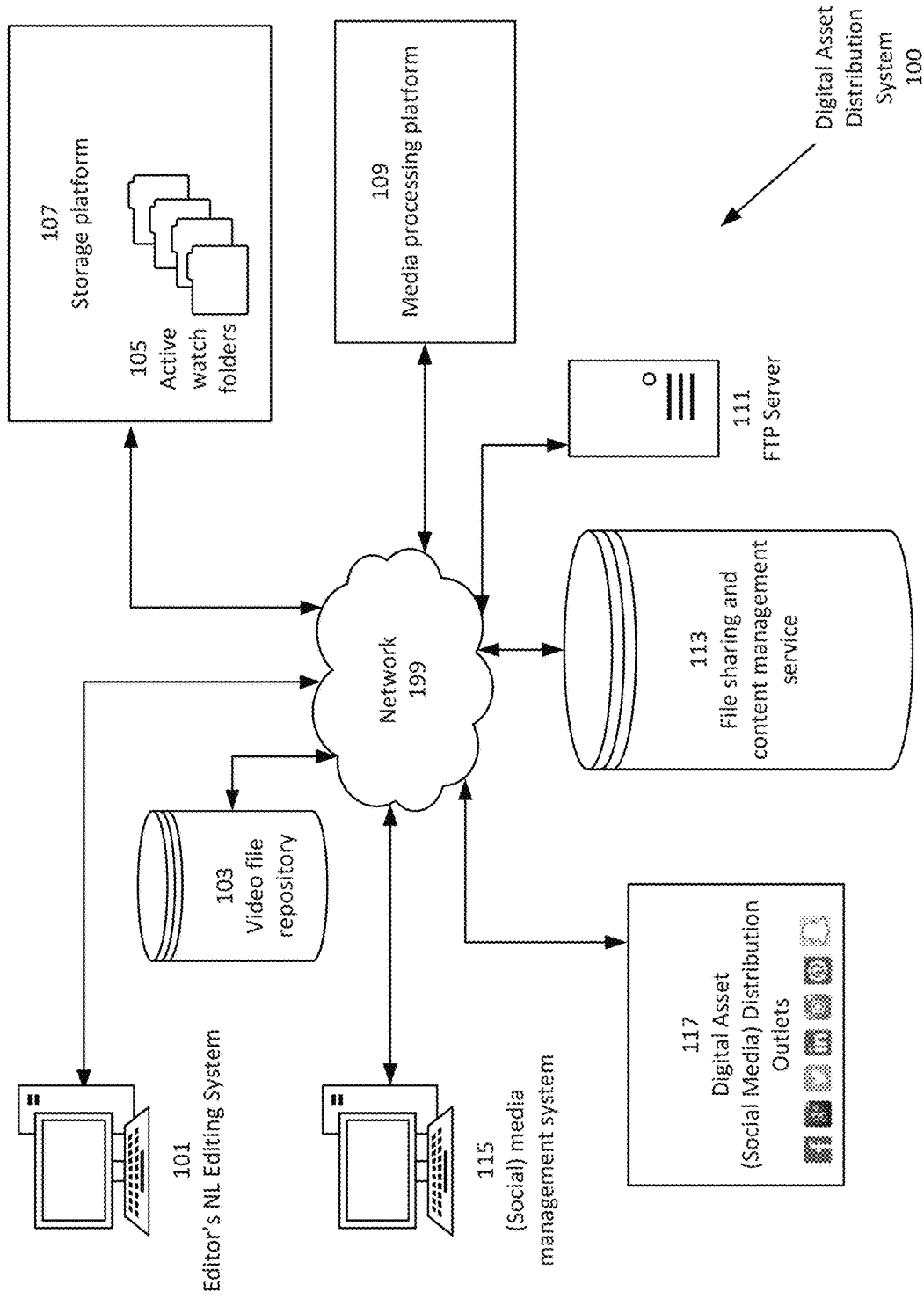
FIG. 1A  Digital Asset Delivery Portal System

FIG. 1B  Social Media Asset Delivery Portal Process
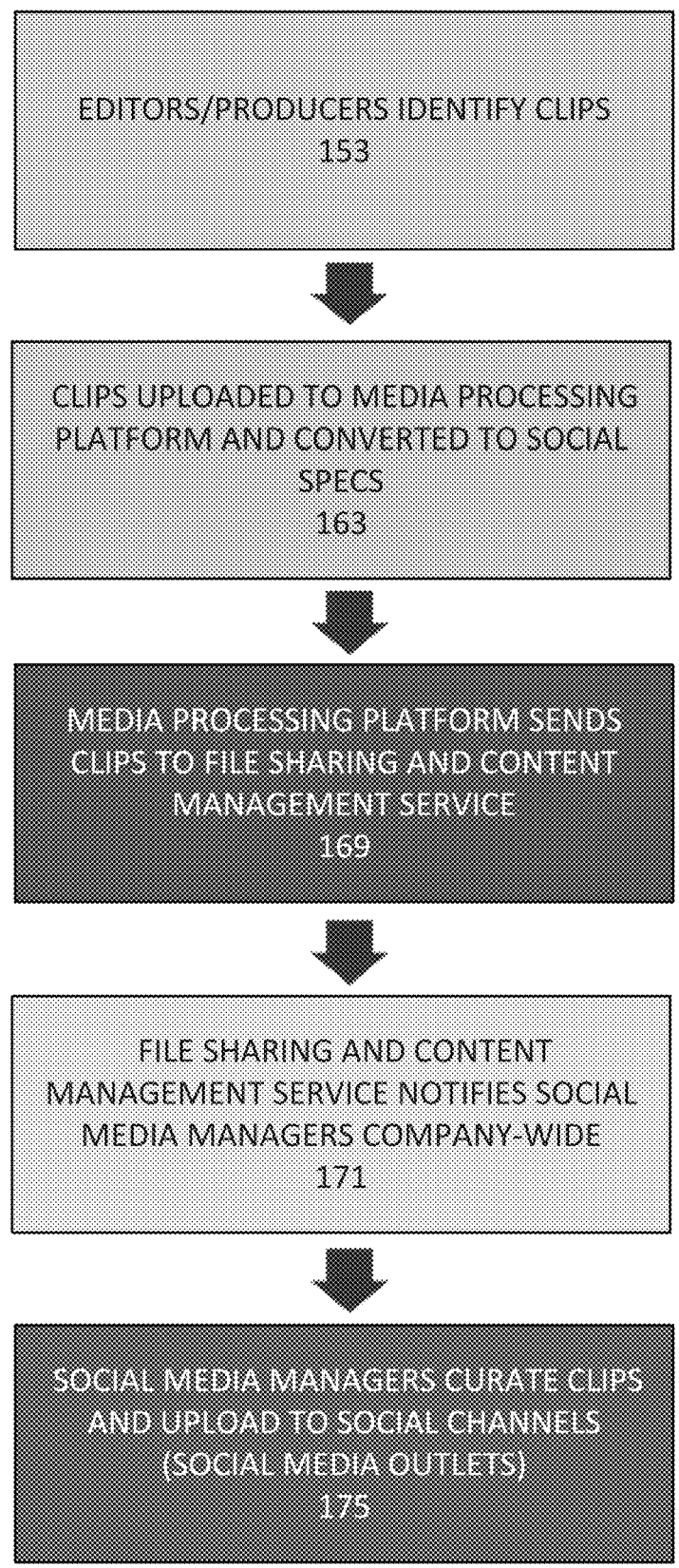

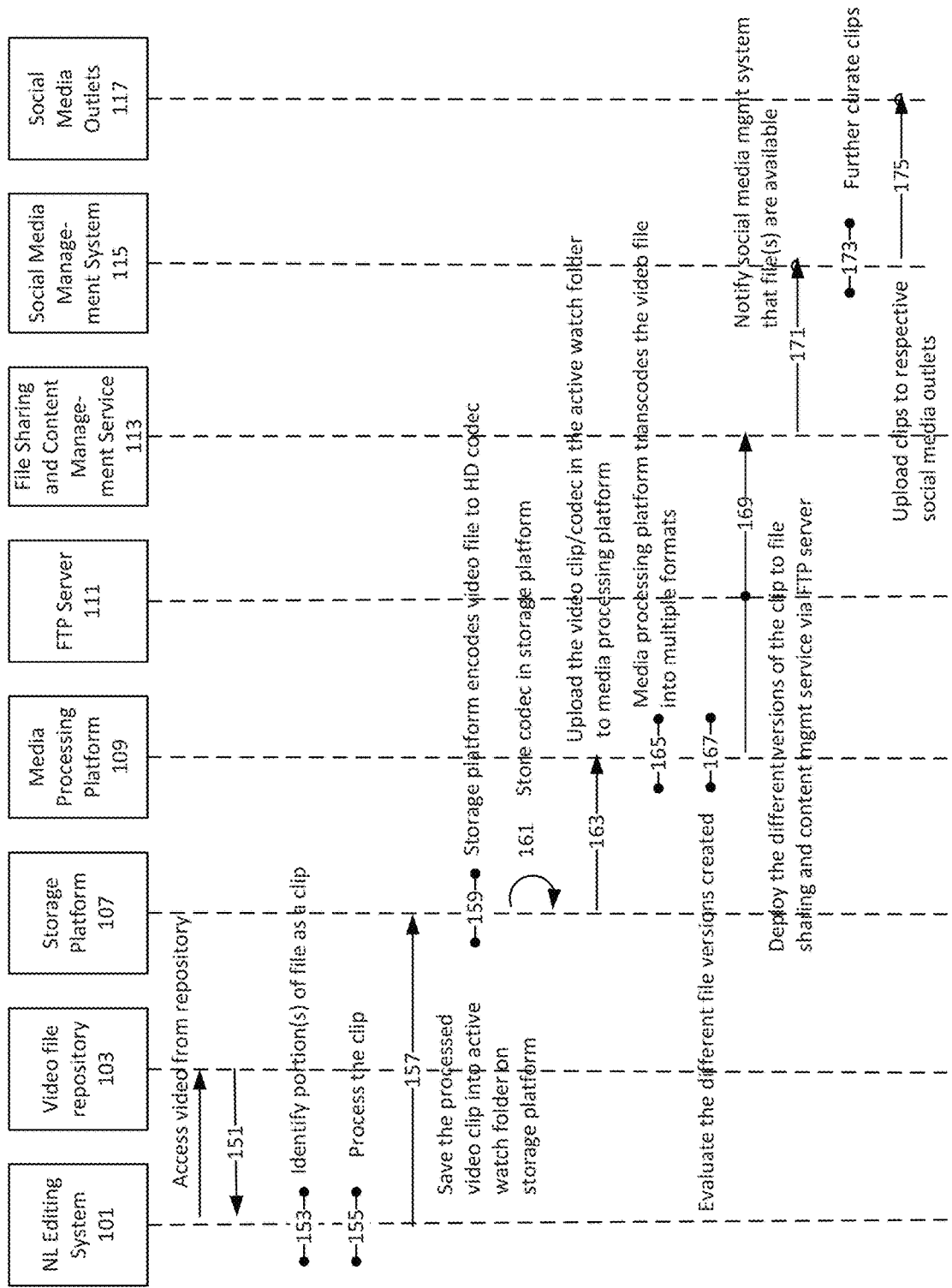
FIG. 1C   Social Media Asset Delivery Portal Process

FIG. 2A   Editors and Producers Identify Clips
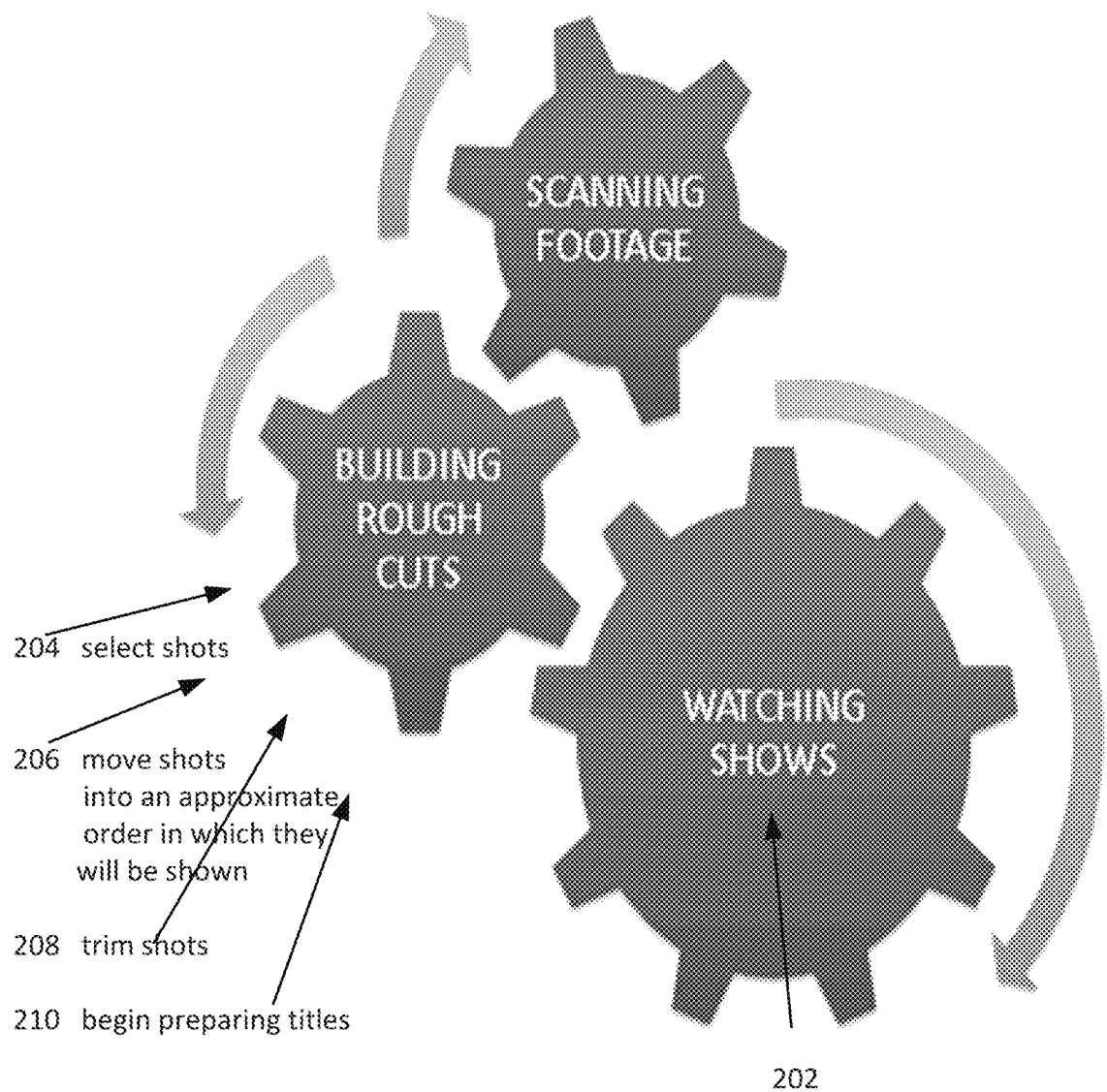
204  select shots
206  move shots
     into an approximate
     order in which they
     will be shown
208  trim shots
210  begin preparing titles
202
As editors and producers review video footage using
the non-linear video editing software, they submit
clips to the social media asset delivery portal.

FIG. 2B
(1) Build rough cut with time-based shots
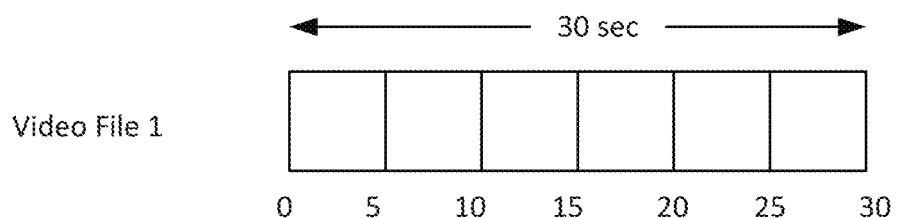
Shots at 0, 5, 10, 15, 20, 25, and 30 sec for a total of 7 shots
(2) Build rough cut with frame-based shots
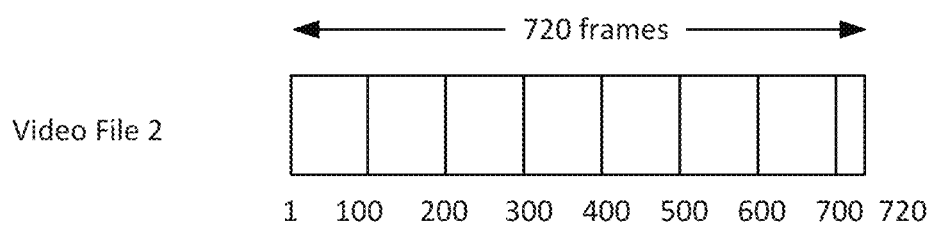
Shots at 1, 100, 200, 300, 400, 500, 600, 700, and 720 frames for a total of 9 shots FIG. 3    Clips are uploaded to the media processing platform and converted to different social media specifications.
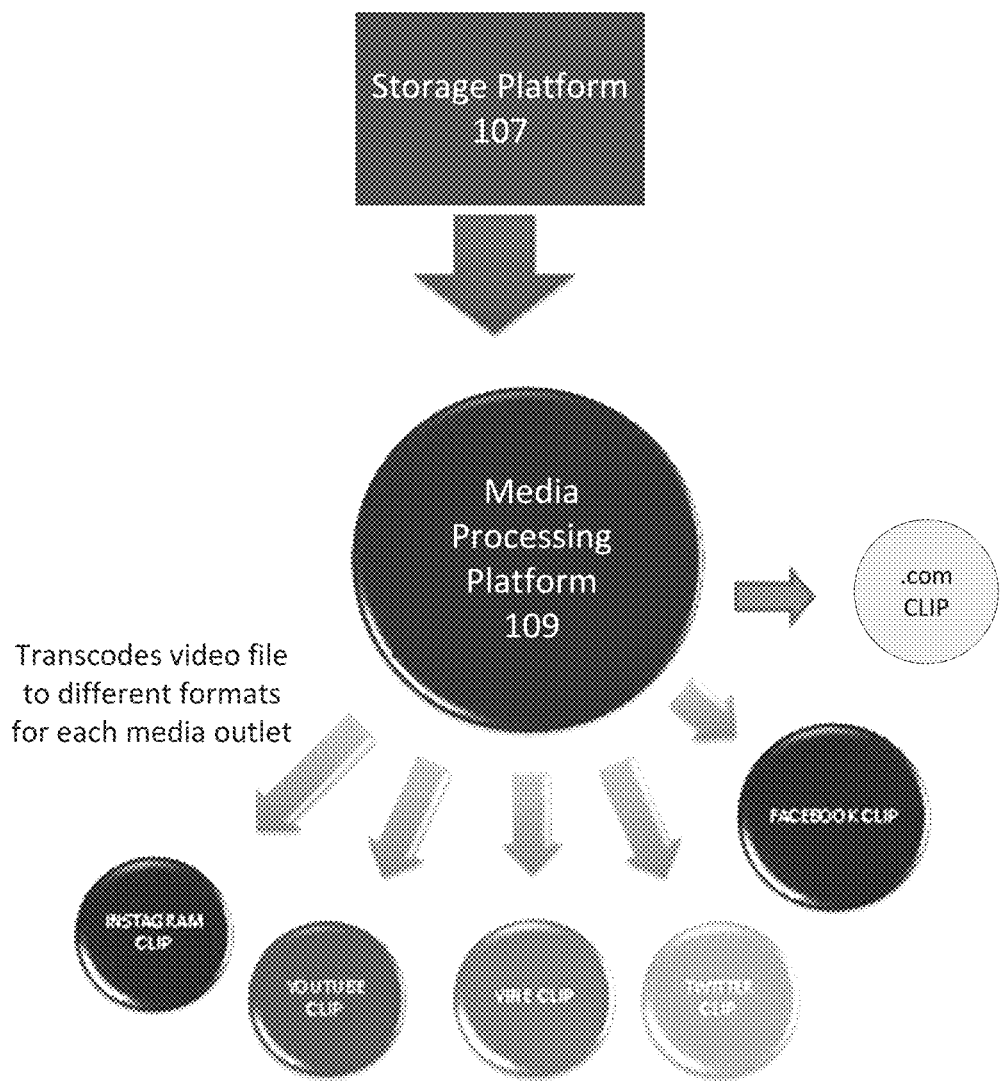

FIG. 4    The media processing platform converts the video file to the appropriate specification and sends the converted files via an FTP Server to corresponding folders on the file sharing and content management service
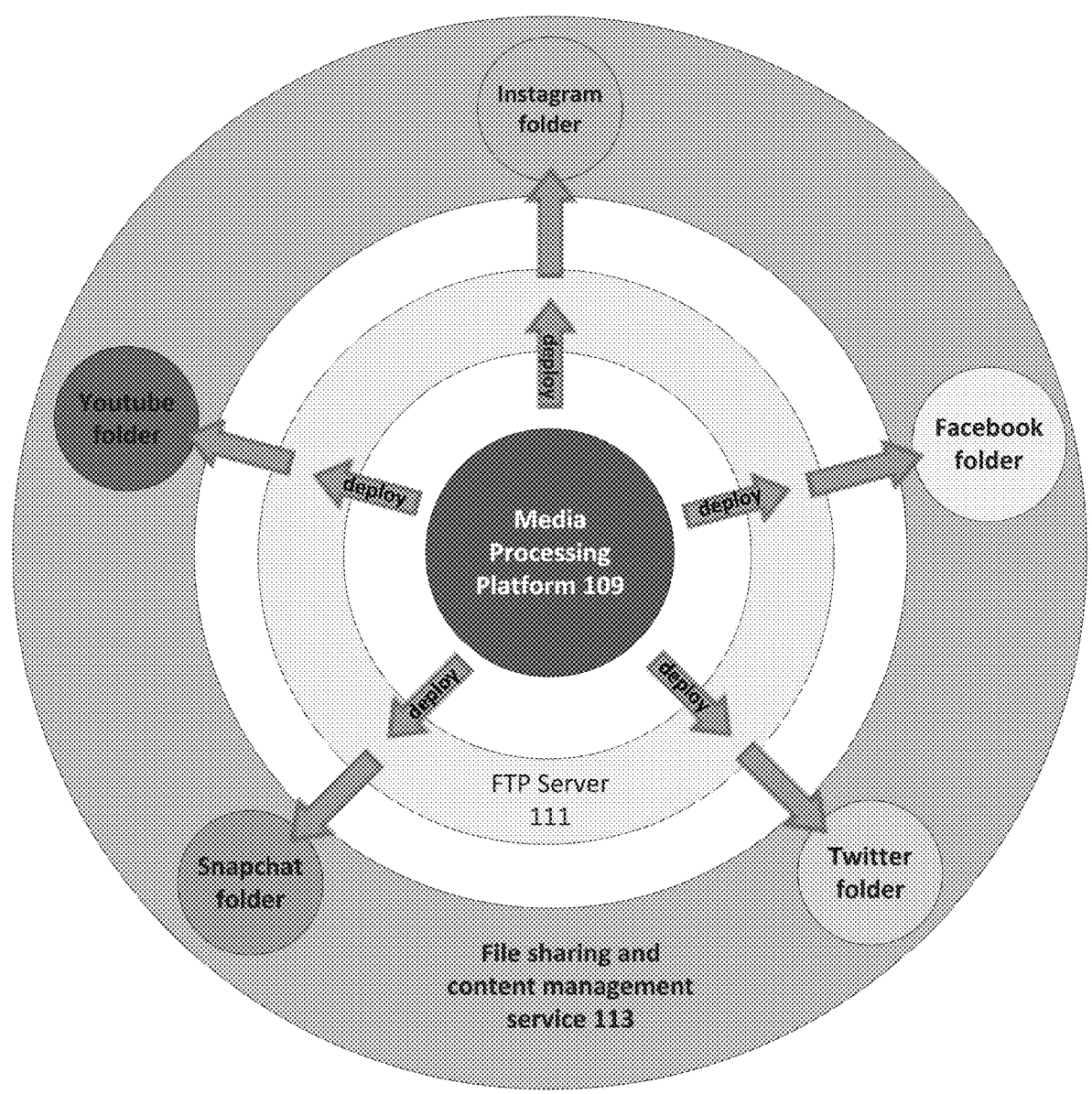

FIG. 5    The system notifies social media management system of the clips' availability
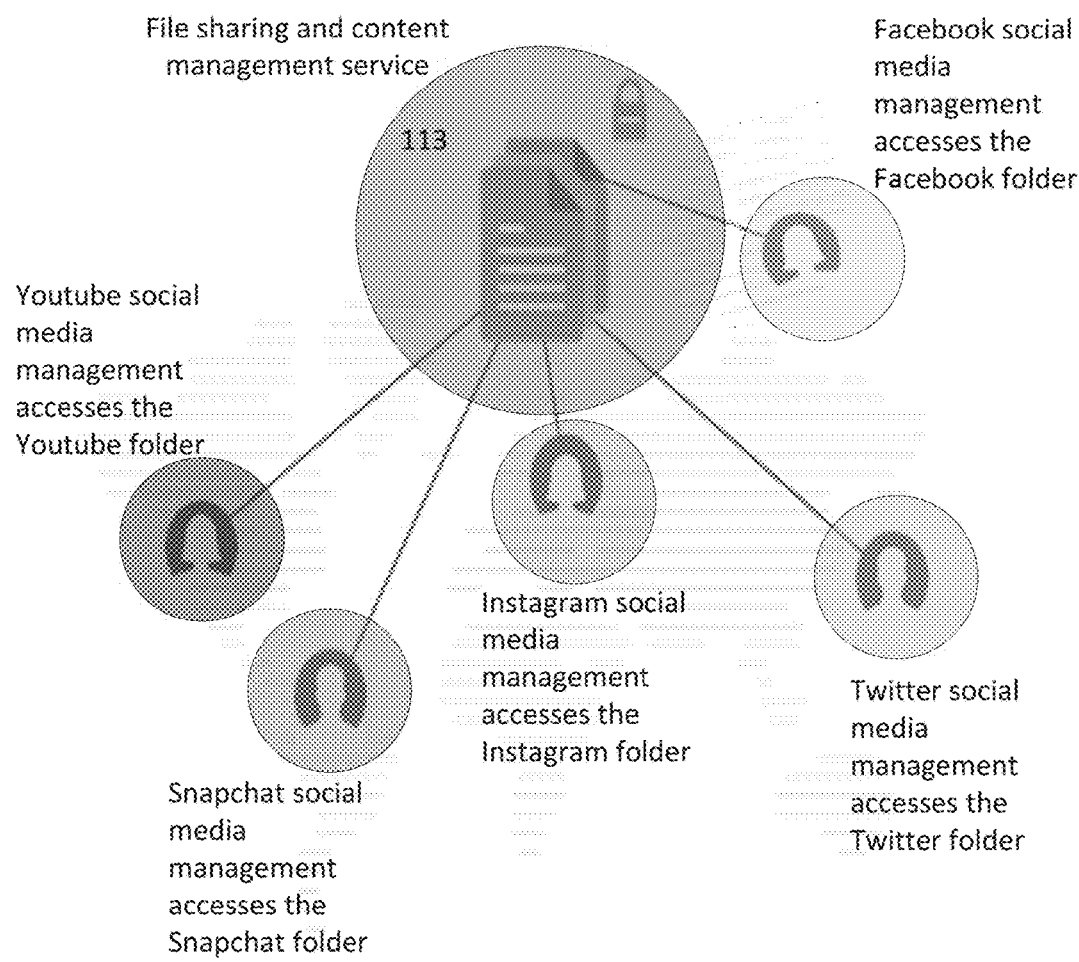

FIG. 6   The social media management system curates the video clips
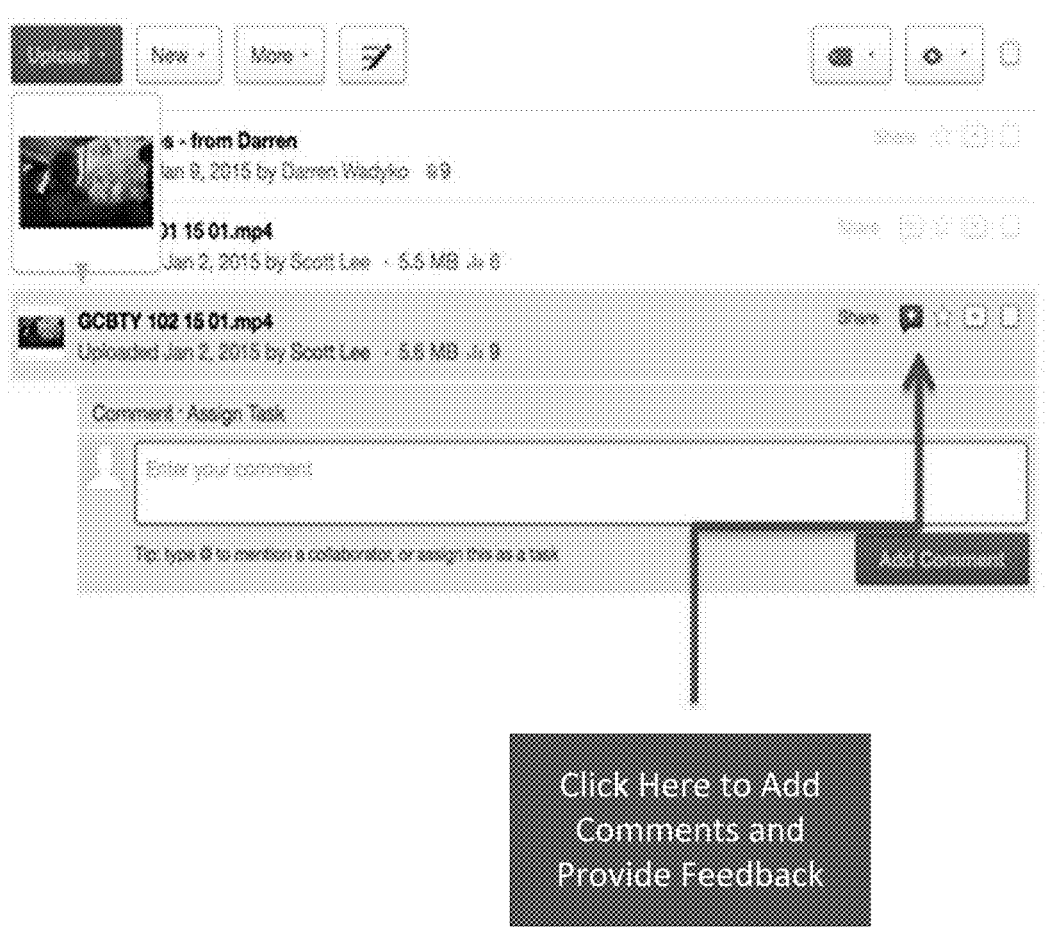

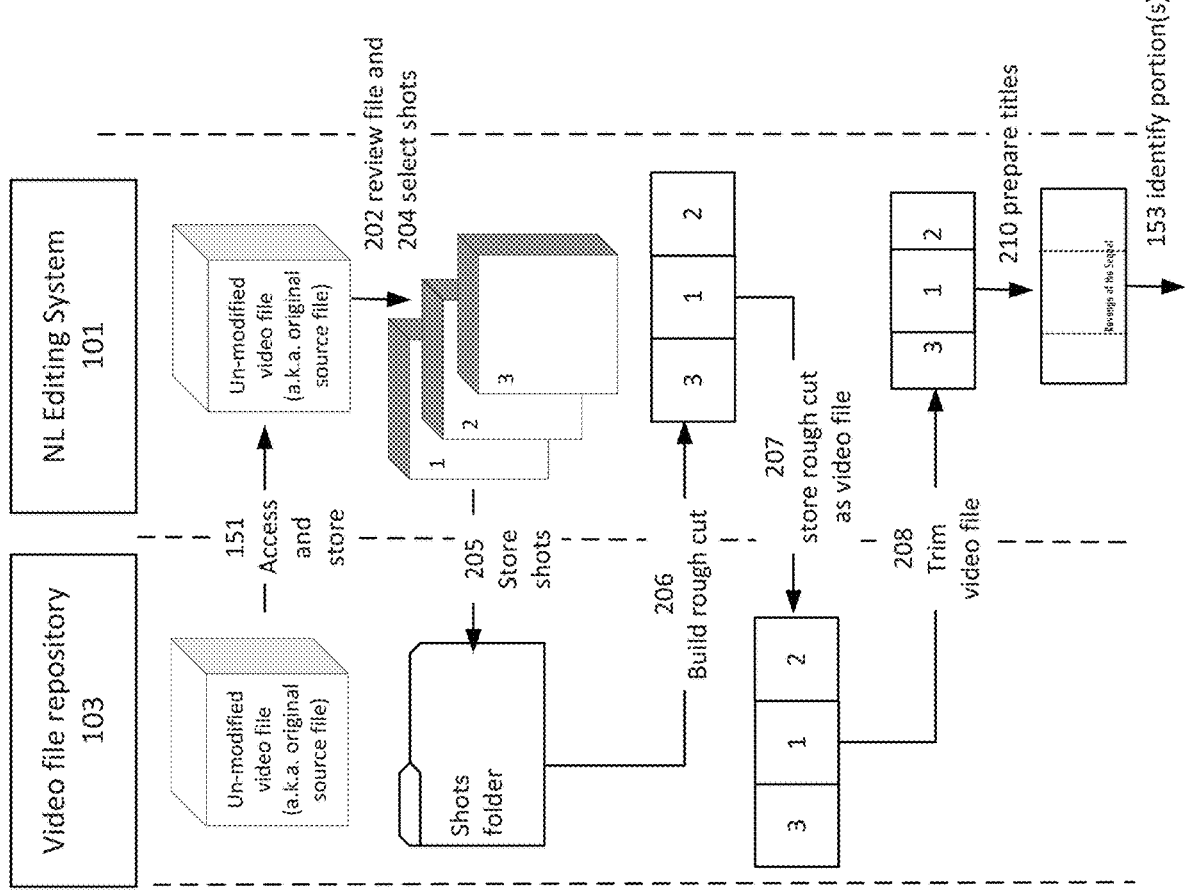
FIG. 7A    Social Media Asset Delivery Portal Process

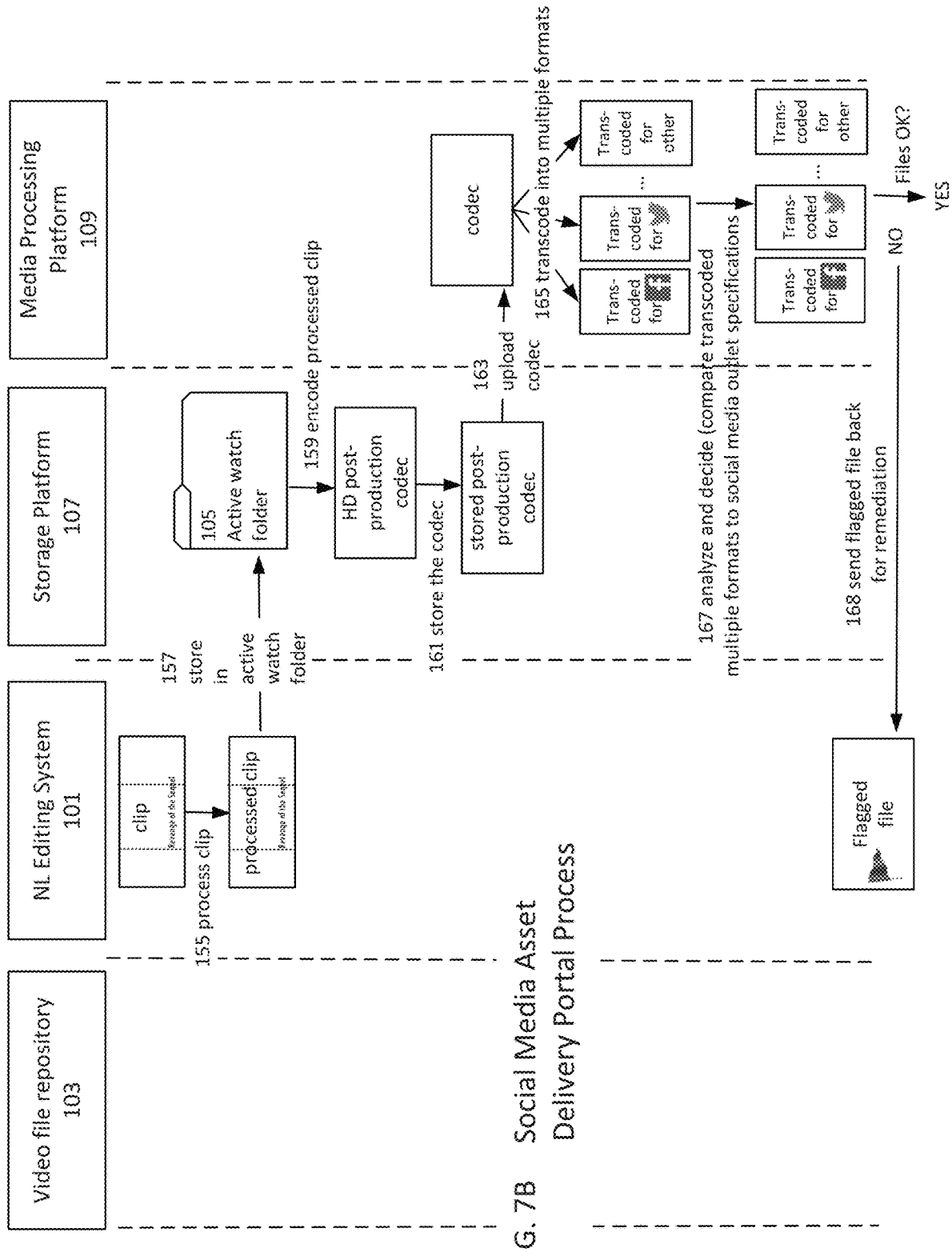
FIG. 7B  Social Media Asset Delivery Portal Process

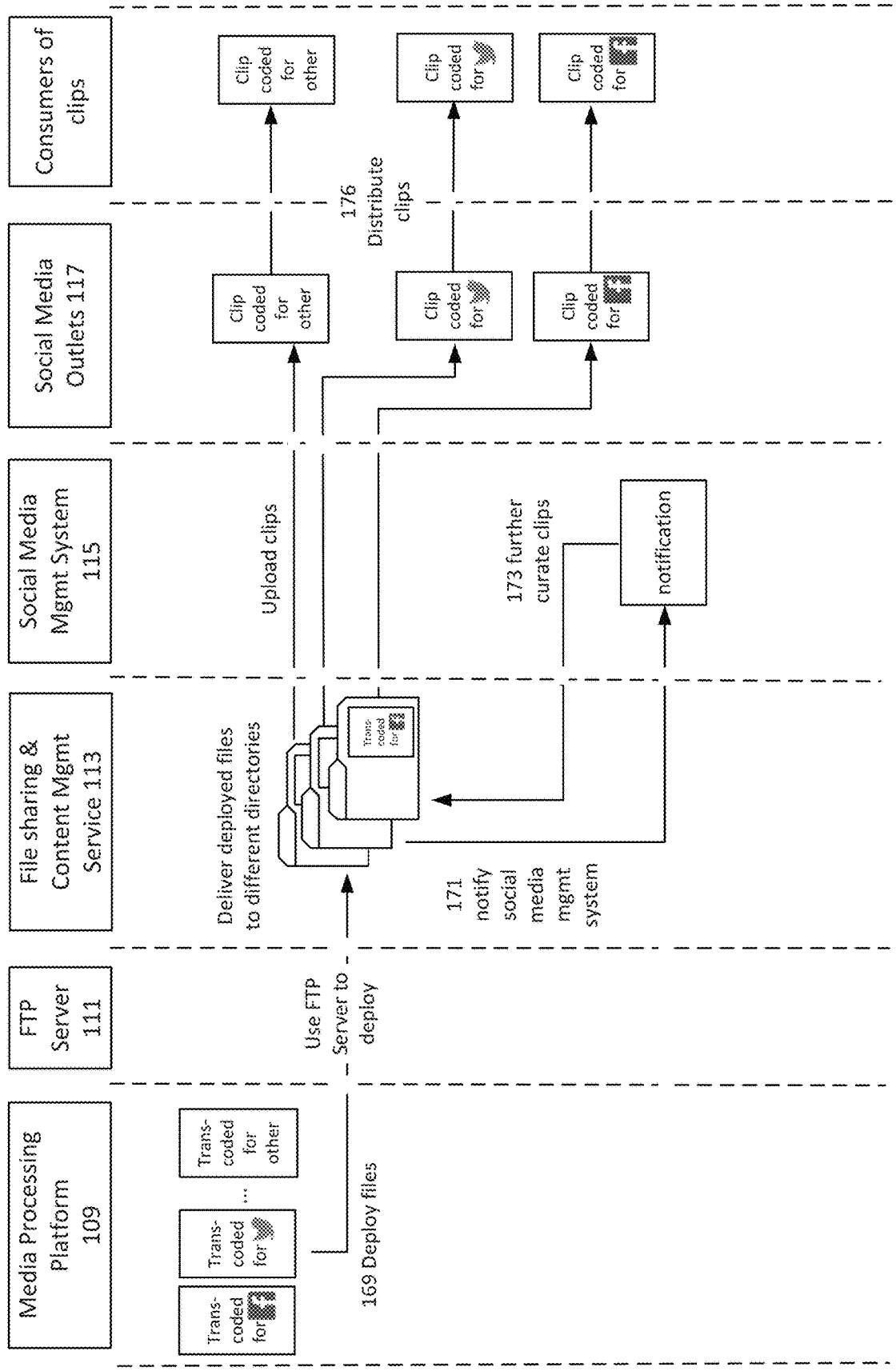
FIG. 7C  Social Media Asset Delivery Portal Process

SOCIAL MEDIA ASSET PORTAL

CROSS REFERENCE TO RELATED APPLICATION

This application claims the benefit of U.S. Provisional Application No. 62/479,682, filed on Mar. 31, 2017. This application incorporates by reference the entire contents of U.S. Provisional Application No. 62/479,682, filed on Mar. 31, 2017.

TECHNICAL FIELD

The invention relates to a media asset delivery systems and more specifically to systems and methods to transcode and deliver digital media assets and video clips to media managers of the distribution channels.

BACKGROUND

The Internet and electronic communications have evolved into more interactive and personalized experiences for users. Many electronic communication channels provide new and different ways to receive electronic communications, including audio and video files. Video and image hosting websites and networked content sites receive content for distribution and viewing by others. Uploaded and archived videos and images include content in many formats and lengths and include many other disparate attributes. Video and image editors must review the content, edit the content, and prepare the content for distribution via many different distribution channels.

Previous systems were very cumbersome. In the past, editors would have to use individualized desktop based conversion software applications to make the variety of platform-specific video formats required to distribute content to the variety of media distribution channels. For example, twenty or more edit consoles would have to have five or six different platform-specific conversion presets loaded. Previous systems and techniques varied greatly in both the settings and outcomes from the different consoles, and there was significant downtime or other processing time required while the systems were being used to convert the files to the different formats, as it was a computer-tasking process that consumed volumes of computer resources. To overcome these technical obstacles, the invention was developed and built. The invention provides new capabilities not previously possible by reducing computer resources and providing simultaneous processing of original content files.

The invention evolved from automatically creating a single file delivery thread where one file was transcoded into one version of the clip and delivered to one media asset distribution outlet. The invention grew to simultaneously process several types of codecs needed for several media asset distribution outlets and was flexibly built to store these assets and codecs into a MAM system. In the past, the industry required many different transcode workflows to create and deliver files to the distribution outlets.

SUMMARY

The invention includes systems and methods for receiving, curating, and distributing audio, video, and image assets as well as other files. The systems automatically receive and process the assets for distribution and consumption in many formats. In one example configuration of the invention, the system distributes the prepared and curated media assets via social media outlets for subsequent consumption.

The invention includes compression techniques and other formatting techniques to manage different sized video segments and image files. The system can compress video segments and image files before providing them to a server for distribution or can have the files compressed by the server itself. The system can use compression techniques to improve the efficiency of transmission and to conserve storage space for the files in various databases and other memory devices.

The system creates a pipeline for the creation of video clips, conversion of video clips to multiple usable formats, delivery of the video clips to social media account managers, and notification to the social media managers of the availability of the clips. In addition to video files, the invention also processes and distributes other digital media assets, including photos, audio files, and other digital files. In the case where the system prepares and distributes video clips to social media outlets, the systems and methods of the invention increase the social media managers' portfolios of video assets for distribution over social networks. The increased number of video assets in the portfolio translates into additional branding opportunities and revenue opportunities through advertising, sponsorships, subscription fees, donations, product placements, cross-sales, and other revenue-generating endeavors.

In one example, the invention generates and provides social media content managers more usable content at a lower cost and enables media companies to deliver higher-quality content in shorter periods of time, with fewer resources and smaller budgets by streamlining workflows from the video creation-to-consumption value chain. The system distributes usable content (video clips) via social media outlets and functions as a branding asset, traffic attractor, and a potential revenue generator (through advertising and other sources). The systems and methods create media asset clips and reduce costs. The system distributes the media asset clips via social media channels.

The invention also provides access to portions of video libraries that social channel managers or other content managers may not have known existed or were under-utilized. The invention increases the number of video clips available to the social channel managers by many orders of magnitude as many social media managers do not typically have access to large libraries of material stored online. Through this system social media managers are able to identify and access potential content that can be used on social media or on other platforms on the Internet. This scaling of the volume of available clips provides additional branding and revenue opportunities through increased advertising and promotions.

In one example embodiment, the invention includes a computer system for delivering digital media assets to distribution outlets, the computer system includes a non-linear editing computer that creates digital shots from an original digital media asset, builds a rough cut of a video clip by assembling the digital shots, and selects at least a portion of the video clip for further distribution. The computer system also includes a software-defined storage media file system that stores the portion of the video clip in an active watch folder and encodes the portion of the video clip to create a post-production video clip. The system also includes a media processing computer platform that ingests the post-production video clip from the software-defined storage media file system and transcodes the post-production video clip simultaneously into multiple alternative file clips with video file formats based on respective targeted distribution outlets. The system also includes a file sharing and content management computer service that receives the multiple alternative file clips from the media processing platform and stores each of the multiple alternative file clips in a directory unique to a targeted distribution outlet and uploads each of the multiple alternative file clips to its respective social media outlet based on the video file format of the respective file clip for distribution to clip consumers.

In one example embodiment of the invention, the non-linear editing computer creates a playlist of (digital) edits and appends the playlist to the digital media asset to create an edited digital media asset without modifying original content of the digital media asset. One type of playlist of digital edits created by the non-linear editing system is a pointer-based playlist of asset identifiers and timecode data representing a storage location where each edit to the digital media asset can be obtained and used to assemble the edited digital media asset.

In one example embodiment of the invention, the non-linear editing system creates the digital shots based on at least one of a time domain, a frame domain, and a threshold brightness of the original digital media asset. When assembling the rough cut, the non-linear editing system can build the rough cut of the video clip based on at least one of location, framing, action, text, dialog, actor, and characteristic of the original digital media asset.

In one example embodiment of the invention, the non-linear editing system trims the rough cut of the video clip based on a time constraint, a file size requirement, an encoding restriction, video cropping, a time-and-day constraint, an advertiser requirement, a sponsorship agreement, and/or a product placement. The non-linear editing system can add titles, video transition effects, and audio transition effects to the rough cut of the video clip.

The invention can also encode the video clip using the storage platform, where at least a portion of the video clip in a predetermined video format includes encoding using at least one of a DNxHR codec, a DNxHD codec, an MPEG-4 codec, an XDCAM codec, and an Apple ProRes HQ codec.

In one example of the invention, the computer system includes a video repository from which the non-linear editing computer accesses the original digital media asset. Additionally, in one example embodiment of the invention, the targeted distribution outlets include social media outlets.

In one example of the invention, the media processing platform flags noncompliant formats where the media processing computer platform compares the multiple alternative file clips to video file formats required by the distribution outlets and flags an alternative file clip and sends the flagged alternative file clip to the non-linear editing system for remediation when one of the alternative file clips does not comply with specifications required by the distribution outlet.

In one example embodiment of the invention, an FTP Server deploys the multiple alternative file clips from the media processing computer platform to the file sharing and content management computer service. Further, the filing sharing and content management service can automatically notify a social media management system of the availability of the multiple alternative file clips for distribution. The file sharing and content management computer service curates the multiple alternative file clips for distribution.

BRIEF DESCRIPTION OF THE DRAWINGS

FIG. 1A shows an exemplary social media asset portal system in accordance with the invention.

FIG. 1B shows a process flow of a method of delivering video clips to social network channels using the system of FIG. 1A.

FIG. 1C shows a sequence diagram of a method for receiving, editing, and distributing media assets (such as audio, video, image, clips, and other files) using the system of FIG. 1A.

FIG. 2A illustrates in detail a method in which editors and producers identify video clips and other media files for distribution over social networks.

FIG. 2B shows two example techniques of building a rough cut video file in accordance with the invention.

FIG. 3 illustrates in detail a method in which contributors and producers provide and upload video clips and other media files to a media processing platform for conversion.

FIG. 4 shows a media processing platform diagram converting video clips and other media files to media distribution service formats and deploying the converted individual video clips and other media files to their respective social media folder databases.

FIG. 5 shows a file sharing and content management service notifying social media channel management systems of the availability of video clips and other media files for distribution.

FIG. 6 shows a user interface of a display device of the social media management system for curation of video clips and other media files.

FIGS. 7A-7C show a graphical depiction of a video asset as the social asset delivery portal system of FIG. 1 prepares and distributes the asset on social media channels.

DETAILED DESCRIPTION

FIG. 1A illustrates a digital asset delivery system 100 that supports video asset creation, editing, storage, and distribution of digital media, according to one embodiment of the invention. While the system 100 can process and distribute many different types of digital media assets to many different digital asset distribution outlets, one example embodiment of the system 100 includes a social media asset delivery portal system 100. The social media asset delivery portal system 100 provides an integrated media asset creation and management platform with a fully modular architecture that enables users (e.g., editors, producers, media content managers, social media outlet managers, and others) to deploy the platform on a module-by-module basis as well as on a workflow-by-workflow basis. Social media asset management functions include identifying, storing, editing, formatting, and distributing digital media assets for consumption on social media sites. The system 100 also supports simultaneous editing of an original source file for distribution on multiple social media sites (i.e., multi-channel distribution) via any number of devices and networks, including wireless mobile devices, broadband, Internet Protocol Television (IPTV), and traditional TV platforms—thereby permitting fast creation-to-consumption of the digital media assets, reducing costs, and increasing revenue over conventional systems. The architecture of the social media asset delivery portal system 100 supports compact to enterprise-scale deployments, and ensures that storage and processing capabilities are robust and scalable, suitable for mission-critical content distribution operations.

An increasing need exists for professional, cost-effective preparation, editing, and distribution of digital media content, such as video clips, still images, and other digital media that can be provided-to and consumed-by viewers over different alternative networks, including different social media outlets. For example, a user of Instagram® or other photo-sharing applications and services that allow users to share pictures and videos consumes digital media content differently than a Youtube® user in terms of video duration, aspect ratios, file formats, frame rates, and other video attributes. The real time delivery of video content, including sports footage, interviews, photos, and other highlights presents problems in such contexts, where it is necessary to identify and accommodate social media outlet limitations prior to transmitting/delivering the digital media asset over a computer network, cellular telephone network, or other data network.

The system 100 provides significant scalability due to decoupled storage using video file repository 103. Conventional editing, publishing, and distribution systems required direct disk access to the video file, which poses a significant scalability issue, as every editing function (e.g., play, trim, scrub, etc.) from the editing system 101 creates disk traffic. If the storage cannot timely respond, a conventional editing application often freezes or crashes, such a scenario is unacceptable for real time feeds. With the social media asset delivery portal system 100, the original source file is downloaded once and edits are appended to the original source file, which remains intact. The centralized storage requirements are reduced by a very significant factor.

As shown in FIG. 1A, one digital media asset portal system 100 of the invention includes a media asset editing system, such as the non-linear editing system 101. The non-linear editing system 101 does not modify the original content of the video in the course of editing, and instead, the edits are specified and modified. The non-linear editing system 101 includes a pointer-based playlist (e.g., an edit decision list) that includes an ordered list of stored sequences of images detailing where the non-linear editing system 101 can obtain each video clip to conform the final version of the media asset. Each time the system 101 renders, plays back, or accesses the edited audio, video, or image, the system 101 reconstructs the edited asset from the original source files and the specified editing steps. In this fashion, the system 101 can change the edits themselves instantaneously and prevent further generation loss during editing of the audio, video, image, or file. In one example of the invention, the non-linear editing system 101 saves the specified editing steps as a playlist that contains an ordered list of reel (i.e., sequences of images stored on disk or other storage media) and timecode data representing where each video clip can be obtained in order to conform the final cut.

The FIGS. show an exemplary system process of the invention for receiving, editing, and distributing media assets (such as audio, video, image, and other files). Used together, the different FIGS. provide details regarding the system and steps performed by the system to process and distribute digital assets. For example, FIG. 1A shows a system 100 in accordance with the invention that processes and distributes digital assets. FIGS. 1B, 1C, and FIGS. 7A-7C provide details regarding the overall preparation and delivery processes of the digital assets, while the other figures show details regarding individual portions of the process.

Prior to the preparation and distribution steps described below, the system 100 ingests digital media files from a number of sources. For example, camera raw footage feeds can be ingested into the system 100 and stored in video file repository 103. There are hundreds of types of raw footage types and file types the invention can accept. Some examples include H.264 Quicktime, MP4 audio files, JPEGS Sequences, TIF Sequences, AVI files, and many other file types. Native footage can also start in several formats including (but not limited to) DNxHD 145/220, Sony XDCAM, QT Pro Res HQ, and a QT Avid same as source file, but the footage can also be generated in QT full res from desktop publishers. The footage can also originate in a variety of framerates, labeled as FPS. Some examples are 23.98, 29.97, 59.94, 30i and 60i. They can be NTSC or PAL formats as well. NTSC tends to be used domestically and PAL tends to be the European standard, but there is some variance there, especially with digital/web-based platforms. Similarly, the system 100 can directly access digital camera memory cards with stored footage and ingest the stored footage and save the file(s) in video file repository 103. Native footage from cameras can start in several formats including (but not limited) to DNxHD 145/220, Sony XDCAM, QT Pro Res HQ, a QT Avid same as source, and 4 K HDR files, depending upon the camera being resourced. In one example of the invention, the raw footage is at least 1920×1080 in size to provide satisfactory resolution, but depending on the original content and the targeted media outlets the invention can accept other file sizes. Likewise, the system 100 can access audio and video digital media files from other storage devices on the network 199, including media asset management (MAM) systems, digital asset management (DAM) systems, and others, and ingest those original source files and store the files in video file repository 103. For example, some files ingested through the MAM system are MXF files that are 1920×1080 in size. In one example of the invention, the MAM and DAM systems contain already-produced content for distribution. In some example embodiments, when the system pulls content from these storage locations, the assets will be cut down to create a completely new asset or the assets will be added to other content to create an entirely new asset as well.

When ingesting the audio or video feeds, the system 100 attaches metadata to the file, which may already have asset ID information or other identifying information associated with the file. In other embodiments of the invention, metadata files, including XML metadata files, can be created downstream of the asset file and attached to the video file during outbound distribution. The system 100 can attach the metadata automatically, including timecodes, localization information, take number, name of the clip, aspect ratios, format type, file specifications, targeted distribution outlet, and other metadata describing the file. Many social media files fall into format categories which start as a simple HD 16×9 1920×1080; 1:1 at 1080; and 9:16 at 1080×1920. All delivered content can include a brand watermark on each asset for distribution. An additional scenario can be one of the above formats but without a brand watermark. It is then possible for the system 100 and the non-linear editing system 101 to access any frame by entering directly the timecode or the descriptive metadata. An editor can, for example at the end of a tournament day on "Chopped" on the Food Network®, easily retrieve all the video files/clips related to the chefs who prepared desserts. Once the system 100 ingests the digital asset and stores it in the video file repository 103, the preparation and distribution process commences.

The FIGS. show the start of the preparation and distribution process in block 151 in FIGS. 1C and 7A, where the non-linear video editing system 101 accesses a video file (original source file) from a repository, such as video file repository 103 via network 199 and stores the file in the working memory (not shown separately) of the editor's non-linear editing system 101. While the video files and other digital assets can be edited on a number of different editing systems, non-linear editing systems perform non-destructive editing on the source material, where the original content is not modified in the course of editing. The non-linear editing system 101 specifies/modifies the edits and incorporates a pointer-based playlist to keep track of the edits. Each time the edited file is accessed, rendered, or played back, the edited file is reconstructed from the original source file and the specified editing steps. The non-linear edits prevent further generation loss as the digital content is edited.

As shown in further detail in block 202 of FIGS. 2 and 7A, as editors and producers review video footage of the video file using the non-linear video editing system 101, the system 101 eventually submits video clips to the digital media management system 115. To accomplish this end, the non-linear video editing system 101 builds a rough cut of the video file by selecting shots of the video files in block 204 In one example of the invention, the video files are DNxHD 145 or DNxHD 220 files, that are 1020×1080 in size. The social media managers can manually intervene to modify the selection process. "Shots" (also known as "thumbnails") of the video file are still frames from the video culled to provide a static representation of the video file. The video editor outputs a DNxHD rough cut video file to a folder on the editing system 101 and to a storage medium, such as video repository 103, for example. That folder is called POST DROP (shots). For example, the non-linear video editing system 101 creates a same as source Quicktime file ("shots") for the video file and creates and delivers the same as source video file (shots) to the POSTDROP (shots) folder on the editing system 101 and to a storage medium such as the video repository 103 in block 205 in FIG. 7A. Once put into this folder the files are delivered to the media processing system and are then processed according to specific parameters into different files for the variety of relevant digital platforms.

Shots can be created from the video file based on a time domain (create a shot at time=0 of the video and every 5 seconds until the end of the video file). As shown in video file (1) of FIG. 2B, this example 30-second video file would then have seven shots (i.e., at 0, 5, 10, 15, 20, 25, and 30 seconds). Similarly, the system 101 can create shots from the video file based on a frame domain (e.g., create a shot at frame 1 and every 100 frames until the end of the video file). As shown in video file (2) of FIG. 2B, this example 30-second video file with 720 frames would then have nine shots (i.e., at frame 1, 100, 200, 300, 400, 500, 600, 700, and 720). The system 101 can use other shot selection criteria to create shots as well. For example, the system 101 can use threshold brightness transitions (often signifying a change in the scene of the video) in the video file to create shots at those transition points. Regardless of the manner in which the system 101 selects the shots, the video file (original source file) remains intact as the system 101 creates and stores the shots.

In block 206, the system 101 moves the shots stored in the shots folder into an approximate order in which they will be shown on various social media outlets 117. In some instances, files are transferred via FTP, file copy into a watch folder, delivered to an S3 bucket to deliver from a Spredfast Delivery portal, or it is published directly from one of the desktop producers. The shots created might be based on location and setup and not necessarily on the order of the story or the order of the final video footage to be shown on the various social media outlets 117. Additionally, the social media managers or editors may choose to create a series of shots to create a new montage of shots, creating a new video clip. In block 206, the system orders the shots based on location, framing, action, text, dialog, actors, props, and other criteria used in creating the final video to be distributed and shown. In block 207, the system 101 stores the assembled rough cut in video file repository 103. The invention incorporates research on social (and other) media users and the platform specific demographics determine the content of the file. The assembled edits, including rough cut files, as well as files that come from finished masters, are then delivered to designated (social media) distribution channels. The original video files can be stored in video repository 103 and/or archived to other storage media. Once the digital assets (original content) are further processed (as described below) and uploaded to media processing platform 109, the original content can be deleted from the editing system 101 or archived to remove it from the editing system to free up additional computing resources.

In block 208, the system 101 trims the video files by paring down video files, by extending video files, by combining multiple video files to create a new video file, by adding music to a video file, and by otherwise customizing the presentation of the video file. For example, the system 101 can choose start and end times for the video based on broadcast and other timing constraints, file size requirements, encoding restrictions, time-and-day controls, advertiser requirements, sponsorship agreements, product placements, and other presentation constraints. In addition to trimming the video file to a determined length and time, the system 101 also crops the video to frame the desired area or to change the frame proportions. The system 101 can also rotate the video, such as when a portrait scene was shot in landscape mode or vice versa. The original video file is not changed. It remains on the source tape, drive, or network storage. As described further below, it is transcoded and will then have a new codec and (potentially) new attributes related to size and quality. The edits can be stored within a composer file, such as an Avid Media Composer file storage system, including Vantage or ISIS. The original video file remains intact, digitized on the system, while the invention creates a new, edited file with its own metadata describing the edited file's characteristics (e.g., length, time, encoding requirements, etc.).

Once the system 101 completes the trimming edits, in block 210, the system 101 prepares the titles of the video file. Titling can also be performed when the file (rough cut) is first created. In this example, the system 101 recognizes scene changes and adds a video transition effect between the scenes, such as a fade, circle, warp, ripple, animations, or other transition effects. Similarly, the system 101 adds audio transitions between the components of the clip. The system 101 also adds titles to the video track based on distribution requirements and other factors. For example, the system 101 can add and stretch a title over the whole clip or over jut a part of it. The system can also add captions, title overlays, and subtitles to the clip. Caption files can be delivered as a side car file and need not be embedded into the video if it requires a music only SCC file or an SRT file. SCC files with dialog can be separately created and (e.g., by a $3^{rd}$ party caption provider such as 3 Play). The caption files can then be delivered as a side car file to the social media partners. As the system 101 adds the titles, the original video file is further appended to reflect the edits incorporated that pertain to the titles. The system 101 customizes the font, size, color, and other display parameters of the title based on the type of clip, the destination(s) of the clip, and other distribution and creative parameters.

In block 153 of FIGS. 1C AND 7A, the non-linear editing system 115 identifies a portion of the video file (original source file) as a video clip (or portions of the video file as video clips) for further distribution. An EDL or Edit Decision List is created within the user interface of the Non-linear editing system 101. This list is generated by the editor who, along with the producer, decides which parts of the original to keep and what to get rid of.

In block 155, the non-linear editing system 101 processes the identified video clip(s). The non-linear editing system 101 can process the video clip based on predetermined criteria to determine the suitability of the video clip for distribution via social media outlets. In one example implementation of the invention, an entertainment company might base their suitability criteria on research of social media trends, past successful video clips, brand-related guidelines and the order and duration each clip should appear in the social media outlets. The system 101 can select clips based on the potential entertainment or informational value of the clip as well as whether the clip fits a desirable brand image and messaging. Some specific examples of criteria include humor, interest, unique information, and conciseness of the content.

Once the non-linear editing system 101 determines to distribute the video clip via social media outlets, in block 157 the system 101 saves the video clip into an active watch folder 105 in storage platform 107. For example, the system 101 can save a video clip using the same settings as the captured footage (i.e., "same as source"). The video clip can be a Quicktime® video file that is then deposited into an (FTP) active watch folder 115 in a storage platform 107. The file stored will be the edited version which is now a new asset and treated as a separate asset in storage. For example, storage platform 107 can include a software-defined storage media file system 107 with 400 megabytes per second of bandwidth and 10 gigabit per second connectivity. The storage platform 107 receives the video clip and in block 159 encodes the video file to create a high-definition video post production codec, such as a DN×HD codec or a DN×HR codec, an XDcam 50 codec, a Pro Res HQ codec, as well as 4K HDR files for example. Additionally, MP4 files are created for MAM storage. The storage platform 107 can include an integrated transcoding module that receives the video files and metadata files or a separate module that transcodes the video files and metadata files as they are en route to the storage platform 107.

In block 161, the system 100 stores the codec in the storage platform 107. For example, a number of file types can be pushed to the non-linear editing system 101 for storage, including a 30 mb MP4 file and a 1.5 MB MP4 Proxy file. The system 100 can simultaneously encode the video file to create other codecs, such as those implementing the SMPTE VC-3 standard, for example. The media processing platform 109 picks these files up from the editing process to create the (MP4) files for MAM ingest as well as the requested files for each social media outlet. The system 100 can use the created codecs as both an intermediate format suitable for use while editing and as a presentation format. The system 100 can store the codec data in an MXF container (material exchange format), a QuickTime container (QuickTime File Format), and other metafile formats with defined standards, such as SMPTE standards (Society of Motion Picture and Television Engineers) and others in the storage platform 107.

As shown also in FIG. 1B, after the system 100 stores the video clip/codec in the active watch folder 105, in block 163 the system 100 uploads the post-production video clip/codec to media processing platform 109. Files that are ready for distribution are uploaded to watch folders based on the brand distribution. If the files contain dialog or music only, they are transcoded accordingly. For example, Food Network Music Only is a watch folder to transcode Food Network assets that contain only music. Media processing platform 109 receives the video clip/codec and manages the media services that operate on the video clip/codec. For example, media processing platform 109 includes a transcoding system that converts the media file (video clip/codec) from its original codec to multiple formats (i.e., alternative file versions/codecs) simultaneously in block 165. Files are transcoded thru the media processing platform 100 to match the specs of each social media portal and the files aspect ratios as well. For example 1:1 that needs to be delivered to Facebook will be a 1080×1080 30 mb MP4 file.

As further shown in FIG. 3, the storage platform 107 uploads clips to the media processing platform 109 and converts the clips to different social media specifications based on the type of social media outlet to which the clips will be delivered. The source of the social media (e.g., Facebook®, Instagram®, etc.) determines the specification for the video file (e.g., length of time, square format, etc.). The media processing platform 109 video transcoding system converts the video file to the different media outlet formats in block 165. The transcode and proper delivery of files is based on several parameters including where the file was dropped and what file aspect ratio was dropped as well. For example, when a 9:16 file is dropped into HGTV dialog, the outbound file will be a 9:16 file MP4 with an HGTV watermark on the file. The file can include a watermark fade in and fade out as well to keep the files looking as close to broadcast as possible. The media processing platform 109 includes computer servers that provide UltraHD and 4 K video processing, including up-conversion from HD content and full GPU acceleration. The transcoding converts original source file formats to a full range of web, mobile, edit, and MPEG-2 formats, for example. Further, the media processing platform 109 can create a full scale of file types that can support anything from a small desktop streaming and mobile streaming to 4K High End Broadcast and HDR support. The servers of media processing platform 109 up convert SD interlaced content to superior quality 1080i and 720p HD output; high-quality de-interlacing also allows the creation of exceptional web and mobile content.

The media processing platform 109 converts each input video file to the different outlet formats simultaneously. The alternative file versions (codecs) include the different formats and the different specifications for each of the social media outlets. The system 100 determines the alternative file versions with the appropriate codecs and specifications based on the particular (social) media outlets that will distribute the video clip. For example, Instagram® limits video clip time to one minute per video and aspect ratio to less than 1.91:1 in landscape and up to 4:5 in portrait. Likewise, Youtube® limits file formats to MOV, MPEG4, AVI, WMV, MPEG-PS, FLV, 3GPP or WebM. Twitter® limits the length of a video, the file size, aspect ratio, frame rate, and other attributes. Facebook® limits minimum resolution, file size, frame rate, aspect ratio, and other attributes. Native media outlets, such as web sites with .com extensions for example, have far fewer requirements. Additionally, some social media outlets require specific audio levels, sample rates, audio channel selections, and the like. In addition, the system 100 also creates and stores a copy of the clip in the video file repository 103, which can be a part of a Media Asset Management (MAM) system or internal content library. The copies of the clips can be stored for future internal and/or external use in media processing platform 109, storage platform 107, video file repository 103, or in other file storage media.

In addition to the transcoding services performed in block 165, the media processing platform 109 includes an analyze and decide system (not shown separately) that evaluates the alternative file versions created and compares the created specifications to those required by the various (social) media outlets in block 167. For example, the system 100 estimates the total run time of the alternative version of the video clip file. This analysis is determined in the media processing platform 109 transcoder before the file is transcoded. This will help determine the fade in and out points for the watermark in each asset as well as keep the file from exceeding the expected runtime limits set by each social media outlet. If the file exceeds the required maximum time limit for a particular social media outlet, the system 100 flags the file and does not distribute it to that outlet. The system 100 will stop the transcode at that point and notify the system of the error so the users can address the time limit issue. The media processing platform 109 can send the flagged file or other indication to a user or operator for remediation and resubmission of the flagged file to the media processing platform 109 for further processing as shown in block 168 in FIG. 7B. Further, the system 100 can add a watermark or other information to the video clip files for each brand that uses the video clip file and/or for each social media outlet that uses the video clip file. For example, one watermark includes a two (2) second fade in at the start of the video clip file and a two second fade out at the end of the video clip file. The system 100 can insert other watermarks with other audio, video, and metadata features as well.

In block 169, the media processing platform 109 uses a deploy action to send the simultaneously converted video clips with the different specifications for the different social media outlets to an FTP server 111 for delivery to file sharing and content management system 113. As also shown in FIG. 4, the deploy action includes delivery to specific folders/directories in the file sharing and content management system 113 for easier retrieval in the process. The system 100 can use other types of servers to effect the transfer of the converted video clips to the file sharing and content management system 113 and the directories. Additionally, the media processing platform 109 can send a proxy file of each of the simultaneously converted video clips to an internal or third-party closed captioning and/or subtitling service that creates closed captions, subtitles, and/or alternative language translations of the converted video clips' primary audio language. The service then returns the proxy files to file sharing and content management system 113.

When the system 100 delivers the converted video clips to the file sharing and content management service 113, the file sharing and content management service 113 automatically notifies social media management system 115 of the clips' availability in block 171 and as shown further in FIG. 5. The notification can include clip attributes such as file name, size, storage location in content management system 113, and other clip attributes. The system can implement storage locations based on the types of clips, the expected use of the clips (e.g., advertising, promotion, biographies, etc.), and other variables. Since these clips are tied into social media outlets, they can be stored in the MAM, and metadata for these files can be stored in PSA if these files are used in further distribution. In this scenario, the media processing platform 109 will not carry or store any metadata for these files after they are transcoded.

Once the social media management system 115 receives notification of the clips, the social media management system 115 can further curate the clips in block 173. The social media management system 115 can add additional information to the file, provide additional information about the file, and post comments regarding the file as further shown in FIG. 6. Once the files are complete, either a Brand Digital Management team will add an ancillary metadata or information to the files or they have entered the information previously in a Spredfast Database and the distribution can happen immediately. Based on market research, advertising and other sales, trends, sales of related products, and other (social) media characteristics, the system 100 and the social media manager can decide which videos files to use, which to pass on, which to hold for later use, and also which to revise. The social media management system 115 may also change the name and other attributes of the clip. After the curation of the clips, the file sharing and content management service 113 uploads the curated clips to the respective social media channels (outlets) 117 in block 175. Uploads to social media outlets 117 can occur along two paths, depending on the business needs. For example, some brands will do their own uploads to the social media outlets 117 when they have certain images of graphics they need to add, while others will use social media marketing and management software, such as Spredfast™, for example. The social media marketing and management software can automatically distribute assets from the file sharing and content management service 113 (e.g., Amazon S3 bucket) location the files that use Spredfast typically have all their metadata already available. For example, Instagram® is one channel, Youtube® is another channel, Facebook® is another channel, Vine® is another channel, and the .com outlet is another channel. The social media management system 115 can download the clips from the file sharing and content management service 113 and maintain a local library of clips where the social media management system 115 distributes and manages the clips before uploading the clips to the social media outlets (platforms) 117. This makes it possible to use created social media content clips as assets in other non-Linear platforms such as Hulu, MPX, or even mobile. Based on asset and distribution constraints and rights management, a cloud based storage system may not allow direct uploads to the (social media) platforms and can be downloaded to the social media management system 115 and then uploaded to the platforms 117. Once the clips are uploaded to the social media outlets, they are distributed to consumers of the various social media sites in block 176.

The systems and methods of the invention provide a social media asset delivery portal. The invention identifies video assets and simultaneously converts the identified video assets to multiple formats based on a number of different social media outlets and their requirements. The system uploads the converted clips to a file sharing and content management service and further curates the stored clips. The system then sends the curated clips to the respective social media outlets for public consumption.

We claim:

1. A computer system for delivering digital media assets to distribution outlets, the computer system comprising:
   a non-linear editing computer that creates digital shots from an original digital media asset, builds a rough cut of a video clip by assembling the digital shots, and selects at least a portion of the video clip for further distribution;

a software-defined storage media file system that stores the at least a portion of the video clip in an active watch folder and encodes the at least a portion of the video clip to create a post-production video clip;

a media processing computer platform that ingests the post-production video clip from the software-defined storage media file system and transcodes the post-production video clip simultaneously into multiple alternative file clips with video file formats based on respective targeted distribution outlets; and a file sharing and content management computer service that receives the multiple alternative file clips from the media processing platform and stores each of the multiple alternative file clips in a directory unique to a targeted distribution outlet and uploads each of the multiple alternative file clips to its respective social media outlet based on at least the video file format of the respective file clip for distribution to clip consumers;

wherein the media processing computer platform compares the multiple alternative file clips to video file formats required by the distribution outlets and flags an alternative file clip and sends the flagged alternative file clip to the non-linear editing system for remediation when one of the alternative file clips does not comply with specifications required by the distribution outlet.

2. The computer system of claim 1, wherein the non-linear editing computer creates a playlist of digital edits and appends the playlist to the digital media asset to create an edited digital media asset without modifying original content of the digital media asset.

3. The computer system of claim 2, wherein the playlist of digital edits created by the non-linear editing system is a pointer-based playlist of asset identifiers and timecode data representing a storage location where each edit to the digital media asset can be obtained and used to assemble the edited digital media asset.

4. The computer system of claim 1, wherein the non-linear editing system creates the digital shots based on at least one of a time domain, a frame domain, and a threshold brightness of the original digital media asset.

5. The computer system of claim 1, wherein the non-linear editing system builds the rough cut of the video clip based on at least one of location, framing, action, text, dialog, actor, and characteristic of the original digital media asset.

6. The computer system of claim 1, wherein the non-linear editing system trims the rough cut of the video clip based on at least one of a time constraint, a file size requirement, an encoding restriction, video cropping, a time-and-day constraint, an advertiser requirement, a sponsorship agreement, and a product placement.

7. The computer system of claim 1, wherein the non-linear editing system adds at least one of titles, video transition effects, and audio transition effects to the rough cut of the video clip.

8. The computer system of claim 1, wherein encoding the at least a portion of the video clip in a predetermined video format includes encoding using at least one of a DNxHR codec, a DNxHD codec, an MPEG-4 codec.

9. The computer system of claim 1 further comprising a video file repository from the non-linear editing computer accesses the original digital media asset.

10. The computer system of claim 1, wherein the targeted distribution outlets include social media outlets.

11. The computer system of claim 1 further comprising:
an FTP server that deploys the multiple alternative file clips from the media processing computer platform to the file sharing and content management computer service.

12. The computer system of claim 1, wherein the file sharing and content management service automatically notifies a social media management system of the availability of the multiple alternative file clips for distribution.

13. The computer system of claim 1, wherein the file sharing and content management computer service curates the multiple alternative file clips for distribution.

14. A computer-implemented method for delivering digital media assets to distribution outlets, the method comprising:

creating digital shots from an original digital media asset with a non-linear editing computer;

building a rough cut of a video clip using the non-linear editing computer by assembling the digital shots, and selecting at least a portion of the video clip for further distribution;

storing the at least a portion of the video clip in an active watch folder with a software-defined storage media file system;

encoding the at least a portion of the video clip with the software-defined storage media file system to create a post-production video clip;

ingesting the post-production video clip from the software-defined storage media file system with a media processing computer platform;

transcoding the post-production video clip simultaneously into multiple alternative file clips with video file formats based on respective targeted distribution outlets; and sending the multiple alternative file clips from the media processing platform to a file sharing and content management computer service; and storing in the file sharing and content management computer service each of the multiple alternative file clips in a directory unique to a targeted distribution outlet;

uploading each of the multiple alternative file clips to its respective social media outlet based on at least the video file format of the respective file clip for distribution to clip consumers;

wherein sending the multiple alternative file clips from the media processing platform to the file sharing and content management computer service includes comparing the multiple alternative file clips to video file formats required by the distribution outlets and flagging an alternative file clip and sending the flagged alternative file clip to the non-linear editing system for remediation when one of the alternative file clips does not comply with specifications required by the distribution outlet.

* * * * *